United States Patent [19]

Suzuki et al.

[11] Patent Number: 4,506,935
[45] Date of Patent: Mar. 26, 1985

[54] BAR-TYPE SLIDE GUIDING APPARATUS WITH HYDROSTATIC BEARINGS

[75] Inventors: Hiroshi Suzuki, Okazaki; Akira Tsuboi, Kariya; Kazuhiko Sugita, Anjoh, all of Japan

[73] Assignee: Toyoda Koki Kabushiki Kaisha, Kariya, Japan

[21] Appl. No.: 482,443

[22] Filed: Apr. 6, 1983

[30] Foreign Application Priority Data

Apr. 12, 1982 [JP] Japan .................. 57-61633
Apr. 12, 1982 [JP] Japan .................. 57-53597

[51] Int. Cl.³ .................................... F16C 32/06
[52] U.S. Cl. ..................... 308/5 R; 308/4 R
[58] Field of Search ......... 308/4 R, 5 R, 4 C, 3 A

[56] References Cited

U.S. PATENT DOCUMENTS 3,386,781 6/1968 Blazek et al. .................. 308/4 C
3,635,532 1/1972 Zerbola ......................... 308/5 R
52-138158 10/1977 JPX .

*Primary Examiner*—Lenard A. Footland
*Attorney, Agent, or Firm*—Oblon, Fisher, Spivak, McClelland & Maier

[57] ABSTRACT

A bar-type slide guiding apparatus is provided with a pair of cylindrical pilot bars, which are fixedly mounted on a stationary base for slidably guiding a slide member therealong. The pilot bars respectively pass through cylindrical holes of the first and second hydrostatic bearings, which are respectively securely fitted in cylindrical bores formed in the slide member so as to thereby mount the same thereon. The first hydrostatic bearing is formed at its cylindrical hole with first and second pairs of fluid pockets, which hydrostatically support the slide member on the first pilot bar in both of orthogonal first and second directions perpendicular to the sliding direction of the slide member. On the other hand, the second hydrostatic bearing is formed at its cylindrical hole with only a single pair of fluid pockets, which hydrostatically support the slide member on the second pilot bar only in one of the first and second directions, so that the slide member is given freedom of movement relative to the second pilot bar in the other of said first and second directions.

2 Claims, 7 Drawing Figures

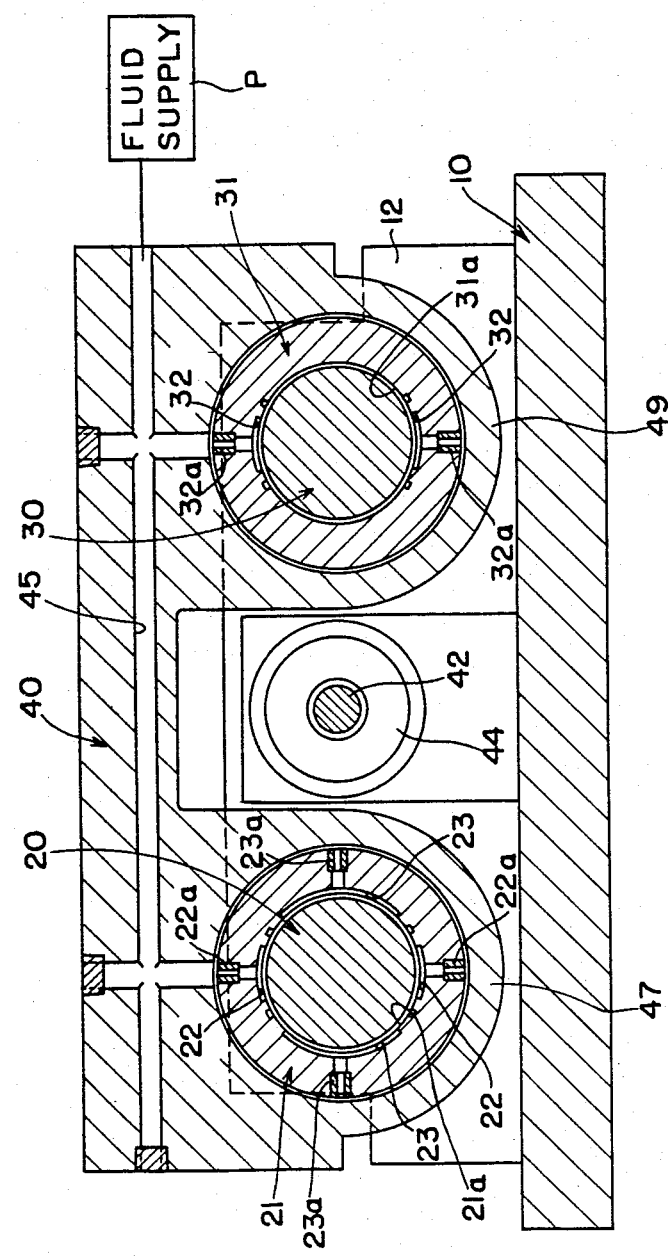

BAR-TYPE SLIDE GUIDING APPARATUS WITH HYDROSTATIC BEARINGS

BACKGROUND OF THE INVENTION

1. Field of the Invention

The present invention relates in general to a bar-type slide guiding apparatus for use in, for example, machine tools. More particularly, it relates to an apparatus for slidably guiding a slide member by means of hydrostatic bearings along a pair of pilot bars.

2. Description of the Prior Art

In a known side guiding apparatus of this knds, a slide member is slidably guided along a pair of pilot bars fixedly supported on a guide base in parallel relation. Hydrostatic air bearings through which a pair of pilot bars pass are respectively mounted in two or more guiding portions thereof and enable the slide member to slide precisely and smoothly. However, the known apparatus requires that the clearance between the external surface of each pilot bar and the internal surface of an associated bearing be precisely maintained constant. In other words, each of the bearings has such a construction as to forcibly align the axis of its internal surface with the axis of each pilot bar associated therewith. Accordingly, when errors in machining and assembling and thermal deformation cause the pair of pilot bars to lose the parallelism therebetween and to tilt relative to each other, the clearance between the internal surface of each bearing and the external surface of each pilot bar associated therewith is varied as the slide member moves. This disadvantageously results in deforming each pilot bar and deteriorating the guiding accuracy. Moreover, an excessive variation of such clearance brings about the contact of each bearing with the associated pilot bar, thereby effecting the dead locking of the slide member on the pilot bars.

Generally, each of such bearings is fitted in a cylindrical bore formed in the guiding portion of the slide member and is secured thereto by fixing a flange portion of the bearing on the slide member by means of bolts. The difference between the bearings and the slide member in material causes the difference therebetween in thermal expansion. This brings about a loosening between the external surface of each bearing and the internal surface of the associated guiding portion, whereby a misalignment takes place between the axes of each bearing and the associated pilot bar.

SUMMARY OF THE INVENTION

Accordingly, it is a primary object of the present invention to provide an improved slide guiding apparatus which does not require a strict parallelism between a pair of pilot bars for smooth sliding movement of a slide member along the pilot bars.

Another object of the present invention is to provide an improved slide guiding apparatus wherein a pair of hydrostatic bearings bodily carrying a slide member thereon enable a pair of pilot bars to serve as reference and auxiliary guide ways respectively, so that the sliding accuracy of the slide member is substantially determined by one of the pilot bars.

A further object of the present invention is to provide an improved slide guiding apparatus wherein a slide member slidable along a pair of pilot bars through a pair of hydrostatic bearings is not movable relative to one of the pilot bars in any other direction than the sliding direction of the slide member, but is movable relative to the other pilot bar also in a direction perpendicular to the sliding direction of the slide member.

A still further object of the present invention is to provide an improved slide guiding apparatus which is easy to produce and which is capable of maintaining a high sliding accuracy in a long period of life.

An additional object of the present invention is to provide an improved slide guiding apparatus wherein hydrostatic bearings slidably riding on a pair of pilot bars are reliably prevented from being loosened from integral connection with a slide member.

Briefly, according to the present invention, there is provided a bar-type slide guiding apparatus comprising first and second hydrostatic bearings, through which first and second cylindrical pilot bars fixedly mounted on a fixed base respectively pass. A slide member is fixedly mounted on the first and second hydrostatic bearings for bodily sliding movement therewith along the pilot bars. The first hydrostatic bearing is formed with first and second pairs of fluid pockets at its internal surface thereof. These pairs of fluid pockets, via hydrostatic pressure force generated in each of them, support the slide member to be unmovable relative to the first pilot bar in any other direction than the sliding direction of the slide member.

On the other hand, the second hydrostatic bearing is formed with a single pair of fluid pockets at its internal bearing surface. This single pair of fluid pockets, via hydrostatic pressure force generated in each of them, support the slide member to be unmovable relative to the second pilot bar in a first direction perpendicular to the slide sliding direction, but movable relative thereto in a second direction perpendicular to both of the slide sliding direction and the first direction. Accordingly, movement of the slide member relative to the second pilot bar in the second direction is permitted within a bearing clearance between the external surface of the second pilot bar and the internal bearing surface of the second hydrostatic bearing. This makes it possible to smoothly slide the slide member without deforming the pilot bars even when these pilot bars are relatively tilted due to errors in machining and assembling as well as thermal deformation. Further, machinings and assemblings in production are easy and can be precisely done since the both of the pilot bars and the bearing surfaces of the hydrostatic bearings are cylindrical.

In another aspect of the present invention, each of the hydrostatic bearings is machined to have a cylindrical external surface whose diameter is larger by a predetermined value at a room temperature than an inside diameter of a bore formed in the slide member. Each of the bearings is fitted in the bore in an expansion fitting method; it is first cooled off and then, fitted in the bore. The bearing surface of each bearing is finally finished after such fitting of the bearing in the bore. This assures a firm connection of each bearing with the slide member in spite of deformations of the external surface and the bore at different rates of thermal expansion.

BRIEF DESCRIPTION OF THE ACCOMPANYING DRAWINGS

The foregoing and other objects and many of the attendant advantages of the present invention will be readily appreciated as the same becomes better understood by reference to the following detailed description of the preferred embodiments when considered in connection with the accompanying drawings, wherein like reference numerals designate indentical or corresponding parts throughout the several views, and in which:

FIG. 3 is an enlarged sectional view of the apparatus taken along the line III—III in FIG. 2;

DETAILED DESCRIPTION OF THE PREFERRED EMBODIMENTS

Figure 1:
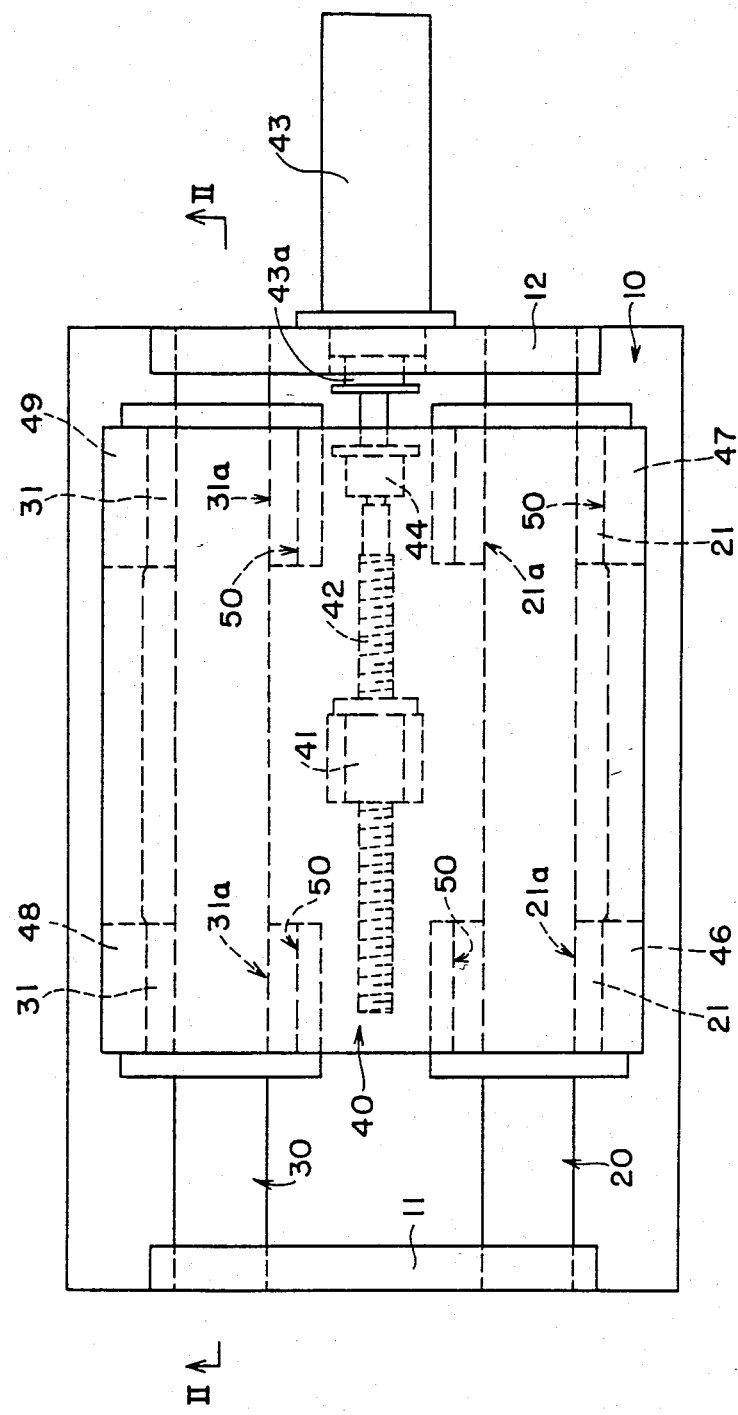
FIG. 1 is a plan view of a bar-type slide guiding apparatus according to the present invention.
Figure 2:
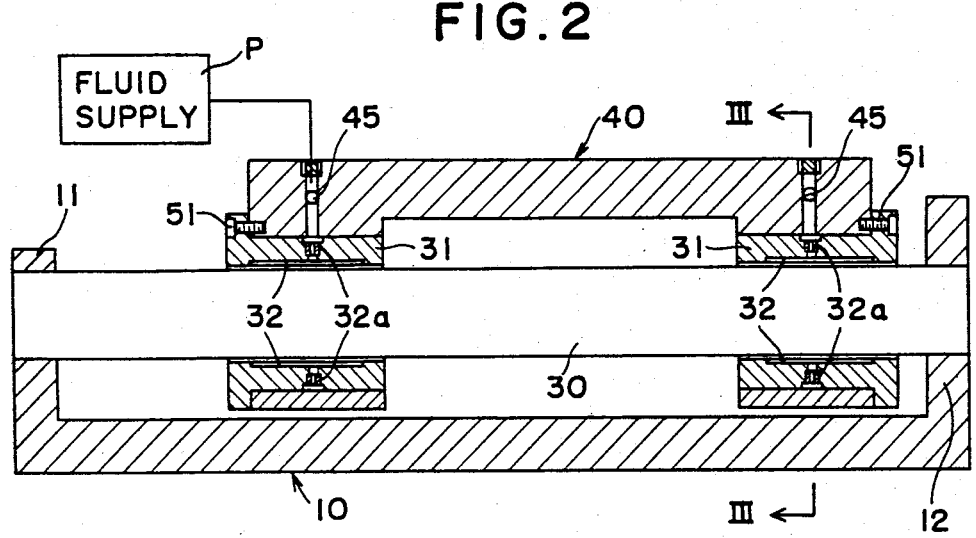
FIG. 2 is a cross-sectional view of the apparatus taken along the line II—II in FIG. 1.

Referring now to the drawings and particularly to FIGS. 1-3 thereof, a bar-type slide guiding apparatus according to the present invention is shown comprising a fixed base 10, which is provided with a pair of support ledges 11 and 12 respectively at opposite ends thereof in a longitudinal direction. A pair of cylindrical pilot bars 20 and 30 are fixedly mounted at opposite ends thereof on the support ledges 11 and 12 and horizontally extend in parallel relation with each other. A slide member 40 is provided with bearing support portions 46–49 respectively at four corners of its underside. Each of the support portions 46–49 is formed with a support bore 50. The bores 50 of the support portions 46 and 47 are in axial alignment with each other and are in parallel relation with the bores 50 of the support portions 48 and 49, which are in turn in axial alignment with each other. A pair of first hydrostatic bearings 21 are respectively fitted in the bores 50 of the support portions 46 and 47 and are secured thereto by means of bolts, not shown. Similarly, a pair of second hydrostatic bearings 31 are respectively fitted in the bores 50 of the support portions 48 and 49 and are secured thereto by means of bolts 51, as shown in FIG. 2. One of the pilot bars 20 passes through internal bores 21a respectively formed in the first bearings 21, while the other pilot bar 30 passes through internal bores 31a respectively formed in the second bearings 31.

The slide member 40 has secured to a center portion of its underside a feed nut 41, which is in threaded engagement with a feed screw 42 rotatable by a drive motor 43. The drive motor 43 is fixedly mounted on the support ledge 12 provided at the right end of the fixed base 10, as viewed in FIG. 1, and is coupled at an output shaft 43a thereof to one end of the feed screw 42 via a coupling member 44. In the apparatus as constructed above, the slide member 40 is slidably guided along the pilot bars 20 and 30 and is moved toward the left or right when the drive motor 43 is operated.

Description will be made hereafter with respect to the configurations of the hydrostatic bearings 21, 21, 31 and 31 constituting essential parts of the present invention. Each of the bearings 21 slidable along the pilot bar 20 is formed at its internal bore 21a with a pair of first fluid pockets 22, which are diametrically opposed with each other in a vertical direction. Each of the bearings 21 is further formed with another pair of second fluid pockets 23, which are diametrically opposed with each other in a horizontal direction (hereafter referred to as "second horizontal" direction) perpendicular to the sliding direction (hereafter referred to as "first horizontal" direction) of the slide member 40. These fluid pockets 22, 22, 23 and 23 are supplied with pressurized fluid via respective throttle elements 22a, 22a, 23a and 23a, which are in fluid communication with a fluid passage 45 for receiving pressurized fluid from a fluid supply P. Thus, hydrostatic pressure forces are respectively generated in the fluid pockets 22, 22, 23 and 23 and forcibly align the axis of each first bearing 21 with the axis of the pilot bar 20. Accordingly, a lower side of the slide member as viewed in FIG. 1 is supported by the pilot bar 20 in both of the vertical direction and the second horizontal direction.

Each of the second bearings 31 slidable along the other pilot bar 30 is formed at its internal bore 31a with only a single pair of fluid pockets 32, which are diametrically opposed with each other in the vertical direction, as best seen in FIG. 3. These fluid pockets 32 are in fluid communication with the fluid passage 45 via respective throttle elements 32a. The internal bore 31a of each second bearing 31 is not formed with any pair of fluid pockets which are diametrically opposed with each other in the second horizontal direction. Therefore, hydrostatic pressure forces are generated only in the fluid pockets 32, and an upper side of the slide member 40 as viewed in FIG. 1 is supported only in the vertical direction. Since a predetermined bearing clearance is provided between the outer surface of the pilot bar 30 and the internal surface 31a of each second bearing 31, the second bearings 31 and 31 and accordingly, the slide member 40 are able to move relative to the pilot bar 30 within the bearing clearance in the second horizontal direction while the slide member 40 is moved along the pilot bars 20 and 30.

In the slide guiding apparatus as described above, the pilot bar 20 serves as a reference guide way and the other pilot bar 30 serves as an auxiliary guide way. That is, when the rotation of the feed screw 42 by the drive motor 43 causes the slide member 40 to move along the pilot bars 20 and 30, hydrostatic pressure forces generated in the fluid pockets 22, 22, 23 and 23 of each first bearing 21 restrict movement of the slide member 40 relative to the pilot bar 20 in both of the vertical direction and the second horizontal direction, namely in any other direction than the first horizontal direction. On the other hand, hydrostatic pressure forces generated in the fluid pockets 32 of each second bearing 31 restrict movement of the slide member 40 relative to the other pilot bar 30 only in the vertical direction. Since no hydrostatic pressure force is generated to restrict movement of the slide member 40 relative to the pilot bar 30 in the second horizontal direction, the slide member is able to move relative to the pilot bar 30 in the second horizontal direction. Accordingly, the slide member 40 is able to smoothly move even in the case where a strict parallelism of the pilot bars 20 and 30 in a horizontal plane is not secured due to errors in machining or assembling or due to thermal deformation. This prevents the pilot bars 20 and 30 from being subjected to an excessive bending force and thus, from being deformed. More importantly, in the apparatus according to the present invention, the sliding accuracy of the slide member 40 principally depends on the machining and assembling accuracies of the pilot bar 20 and the first bearing 21, but does not substantially depend upon those accuracies of the other pilot bar 30 and the second bearing 31. Accordingly, it can be easily realized to secure a high sliding accuracy of the slide member 40.

Figure 4:
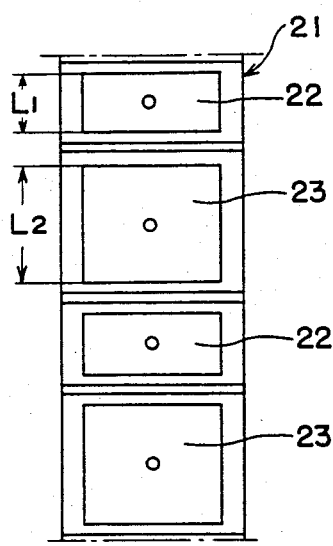
FIG. 4 is a development of a cylindrical bearing surface of a hydrostatic bearing shown in FIGS. 1-3.
Figure 5:
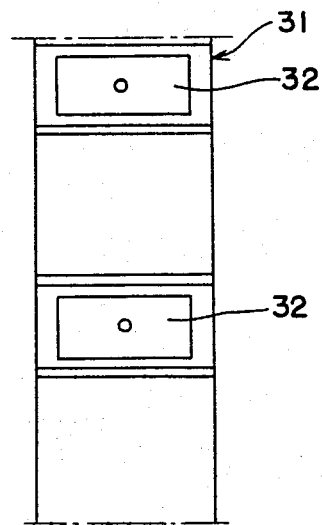
FIG. 5 is a development of a cylindrical bearing surface of another hydrostatic bearing shown in FIGS. 1-3.

In the apparatus according to the present invention, the pair of second fluid pockets 23 provided in the first bearing 21 support the slide member 40 against movement thereof in the second horizontal direction. This may results in weakening the supporting rigidity of the slide member 40 in the second horizontal direction. In order to avoid this drawback, in this particular embodiment, the circumferential width L2 of each second fluid pocket 23 in the first bearings 21 and 21 is made sufficiently wider than that L1 of each first fluid pocket 22, as seen in FIG. 4.

Although the above-described particular embodiment shows a slide guiding apparatus of the type wherein the slide member 40 is horizontally slidable along the pilot bars 20 and 30, the present invention is not limited to the apparatus of such type. The present invention is otherwise applied to a slide guiding apparatus of the type wherein a slide member is slidable along a pair of vertically extending pilot bars.

Figure 7:
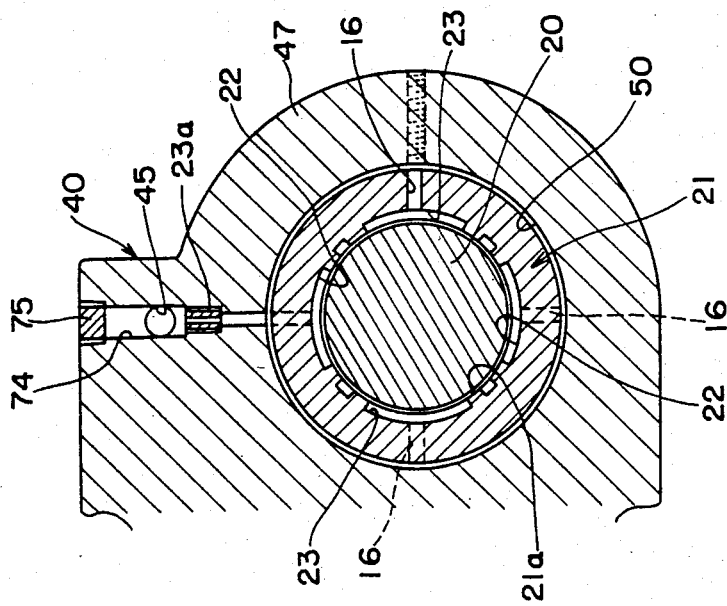
FIG. 7 is a fragmentary sectional view of the apparatus taken along the line VII—VII in FIG. 6.
Figure 6:
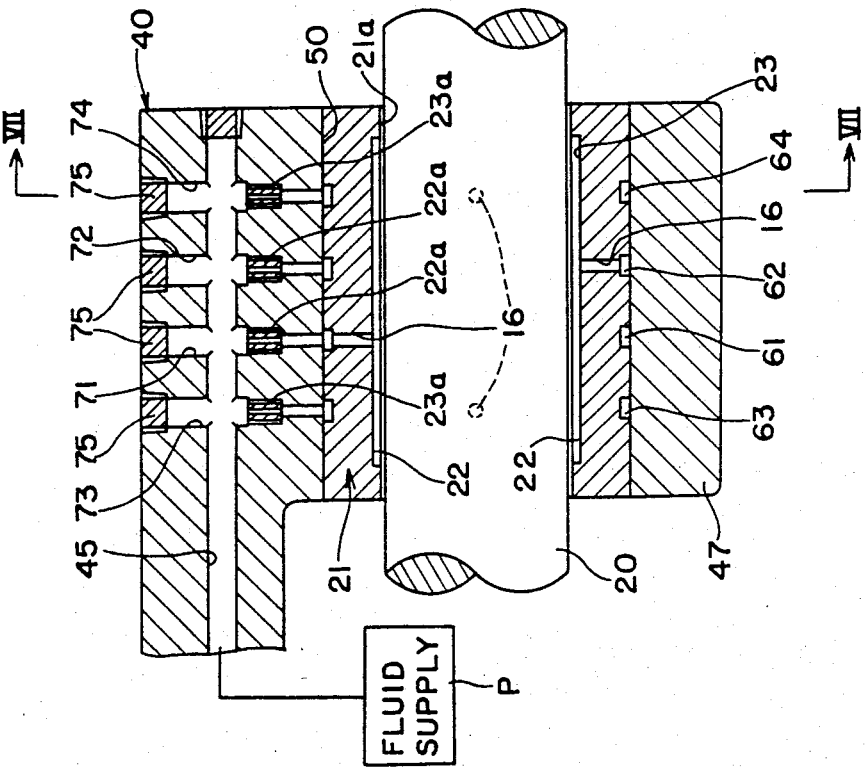
FIG. 6 is a fragmentary sectional view of a part of another embodiment according to the present invention.

FIGS. 6 and 7 show a second embodiment of a slide guiding apparatus according to the present invention. In this embodiment, the above-described hydrostatic bearings 21, 21, 31 and 31 are respectively fixedly mounted in the bores 50 of the bearing support portions 46–49 by an expansion fitting method. As typically illustrated, the bearing 21 is formed with the pairs of first and second fluid pockets 22, 22, 23 and 23 at its internal surface 21a and is further formed with four annular grooves 61–64 at its outer surface for fluid communications respectively with the pockets 22, 22, 23 and 23. The bearing 21 is finished to have an outer diameter larger by a preselected interference than an inside diameter of the bearing support portion 47. Immediately before assembling, the bearing 21 is cooled off to shrink the outer diameter to a smaller dimension than the inside diameter of the bore 50 and then, fitted therein. After fitting, the internal surface 21a of the bearing 21 is finally finished to provide the predetermined bearing clearance between itself and the outer diameter of the pilot bar 20. The bearing support portion 47 is formed therein with four supply passages 71–74, which extend radially of the bearing 21 so as to respectively connect the annular grooves 61–64 with the fluid passage 45. The throttle elements 22a, 22a, 23a and 23a are in threaded engagement respectively in the supply passages 71–74, and one end of each of the supply passage 71–74 is closed by means of a scew cap member 75. This makes it possible to remove any of the throttle elements 22a, 22a, 23a and 23a for replacement with a spare throttle element. A reference numeral 16 denotes radial passages respectively connecting the annular grooves 61–64 to the fluid pockets 22, 22, 23 and 23.

In the second embodiment as constructed above, each of the bearings 21, 21, 31 and 31 is fixedly mounted in the bore 50 by the expansion fitting method. Accordingly, each bearing 21 or 31 is reliably prevented from being loosened from fitting engagement with the bore 50 even when they are respectively deformed at different rates of thermal expansion. In addition, the internal surface 21a of the bearing 21 is finally finished after assembling, and this enables the slide member 40 to move with a high accuracy.

Obviously, numerous modifications and variations of the present invention are possible in light of the above teachings. It is therefore to be understood that within the scope of the appended claims, the present invention may be practiced otherwise than as specifically described herein.

What is claimed is:

1. A slide guiding apparatus comprising in combination:
   a fixed base;
   first and second cylindrical pilot bars fixedly mounted on said fixed base and extending in parallel relation with each other in a first direction;
   a first hydrostatic bearing having a cylindrical hole through which said first pilot bar passes, said first hydrostatic bearing being formed at said cylindrical hole thereof with a first pair of fluid pockets which are diametrically opposed with each other in a second direction perpendicular to said first direction and a second pair of fluid pockets which are diametrically opposed with each other in a third direction perpendicular to both of said first and second directions, each of said second pair of fluid pockets being wider in circumferential width than each of said first pair of fluid pockets;
   a second hydrostatic bearing having a cylindrical hole through which said second pilot bar passes, said second hydrostatic bearing being formed at said cylindrical hole thereof with a third pair of fluid pockets which are diametrically opposed with each other in said second direction, and each of said first pair of fluid pockets being substantially the same width as each of said third pair of fluid pockets in a circumferential direction;
   a slide member fixedly mounted on said first and second hydrostatic bearings for bodily movement therewith along said first and second pilot bars; and
   means for supplying pressurized fluid to said first, second and third pairs of fluid pockets so as to generate hydrostatic pressure force in each of said first, second and third pairs of fluid pockets.

2. A slide guiding apparatus as set forth in claim 1, wherein said means for supplying pressurized fluid to said first, second and third pairs of fluid pockets includes:
   a plurality of throttle elements respectively in fluid communication with said first, second and third pairs of fluid pockets for generating hydrostatic pressure force in each of said first, second and third pairs of fluid pockets.

* * * * *